United States Patent [19]

Nissen et al.

[11] 4,211,213
[45] Jul. 8, 1980

[54] SOLAR PANEL

[76] Inventors: Roland N. Nissen, 4904 Sullivan, Wichita, Kans. 67204; Lyle H. Soldan, 2815 Wilmohr Dr., Wichita, Kans. 67223

[21] Appl. No.: 944,546

[22] Filed: Sep. 21, 1978

[51] Int. Cl.² ............................ F24J 3/02; F28F 3/14
[52] U.S. Cl. ..................................... 126/452; 126/416; 126/444; 126/449; 165/170
[58] Field of Search ................ 126/270, 271; 237/1 A; 165/170, 171, 49, 152, 142

[56] References Cited

U.S. PATENT DOCUMENTS

| | | | |
|---|---|---|---|
| 3,018,087 | 1/1962 | Steele | 126/271 |
| 3,369,539 | 2/1968 | Thomason | 126/271 |
| 3,841,738 | 10/1974 | Caplan | 126/271 |
| 4,010,733 | 3/1977 | Moore | 237/1 A |
| 4,033,326 | 7/1977 | Leitner | 126/271 |
| 4,051,832 | 10/1977 | Stelzer | 126/270 |
| 4,056,090 | 11/1977 | Henriques et al. | 165/171 |
| 4,062,350 | 12/1977 | Reed | 126/271 |
| 4,077,393 | 3/1978 | Mattson | 126/271 |
| 4,089,324 | 5/1978 | Tjaden | 165/170 |
| 4,125,108 | 11/1978 | Porter et al. | 126/271 |

Primary Examiner—James C. Yeung
Assistant Examiner—Daniel J. O'Connor
Attorney, Agent, or Firm—John H. Widdowson

[57] ABSTRACT

A solar panel having at least two corrugated heat retention surfaces, each including a pair of opposite sides and opposing ends. One of the retention surfaces has a surface defining a plurality of dimples. The retention surfaces are mated with each other and remain separated by the dimples. One end of the mated heat retention surfaces includes an orifice means to control the flow of water between the mated surfaces and the other end has an outlet for solar heated water. A process for heating water in a swimming pool, or the like, comprising dimpling two corrugated heat retention surfaces; mating the heat retention surfaces; orificing one end of the mated surfaces to control the flow of water therebetween; installing at least one pair of the mated surfaces on a means for exposing the mated surfaces to the sun; pumping water from the swimming pool to the orificed end of the mated surface; flowing water through the mated surfaces; absorbing BTU's into the flowing water; and returning the BTU absorbed water to the swimming pool.

11 Claims, 15 Drawing Figures

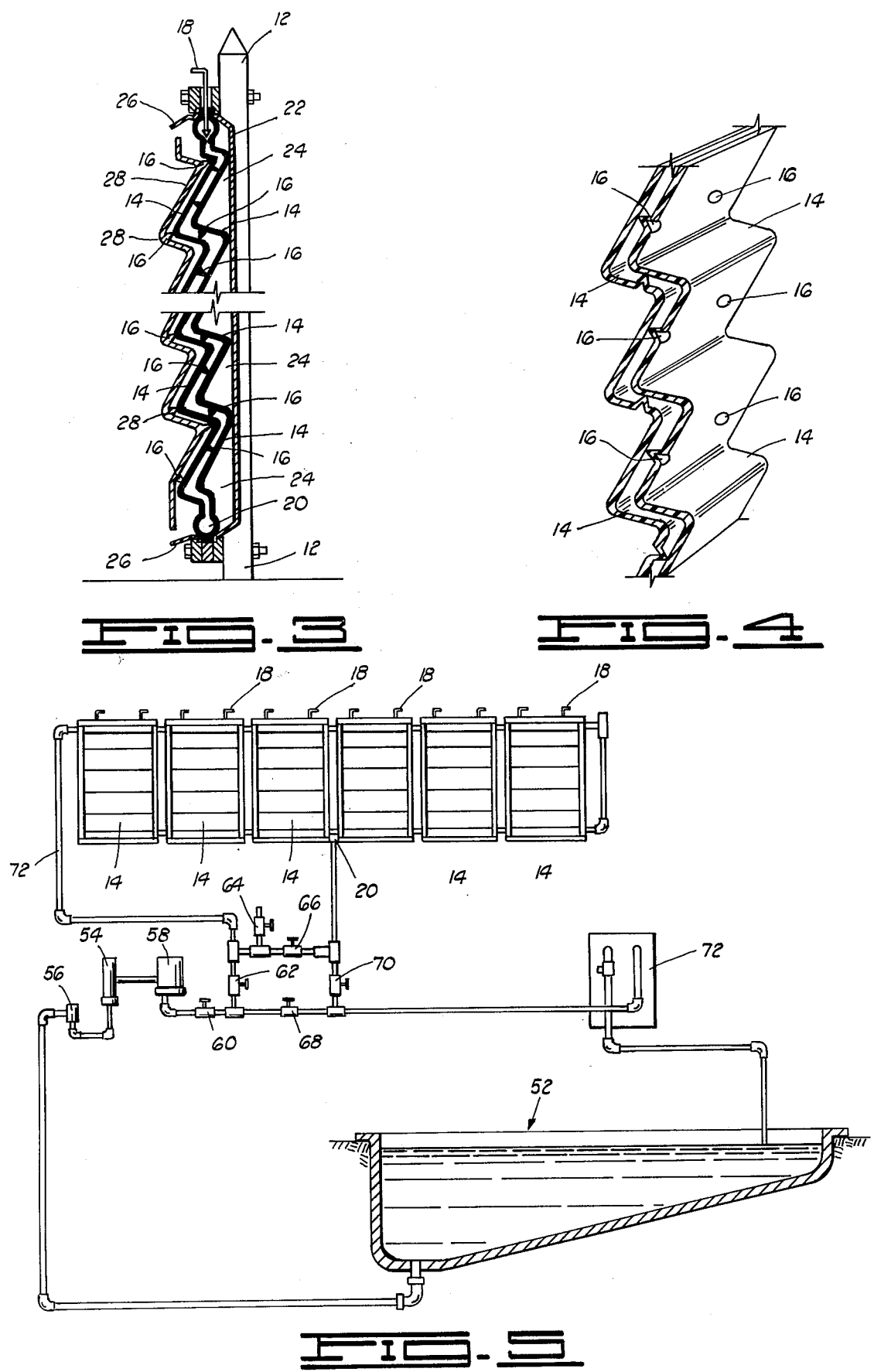

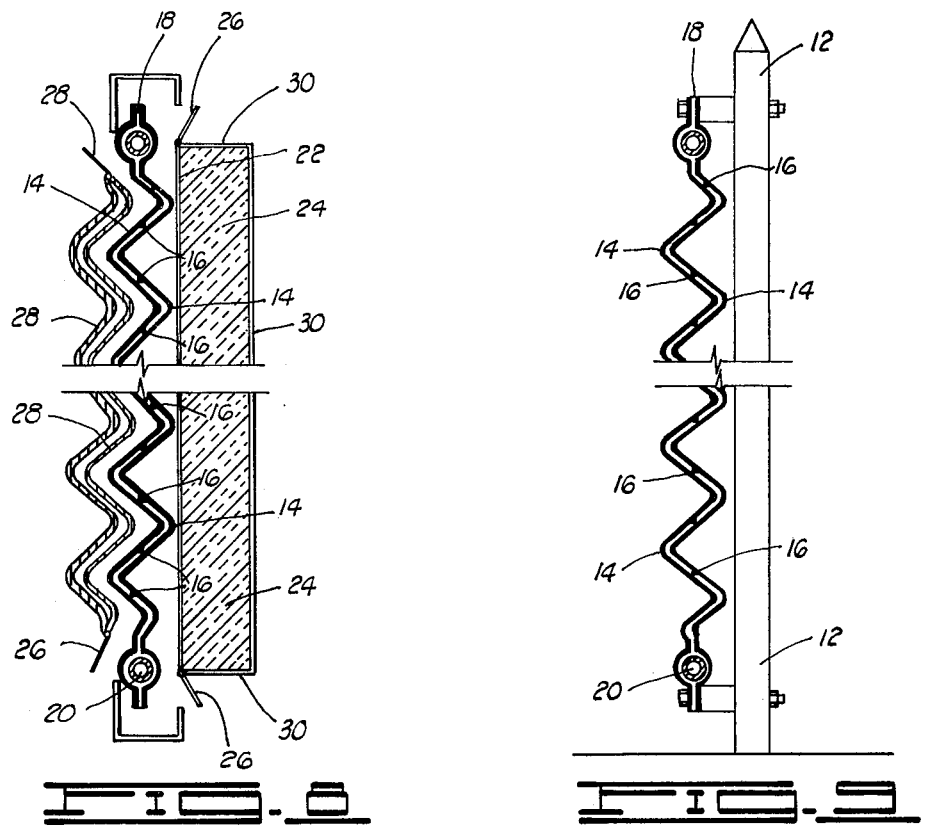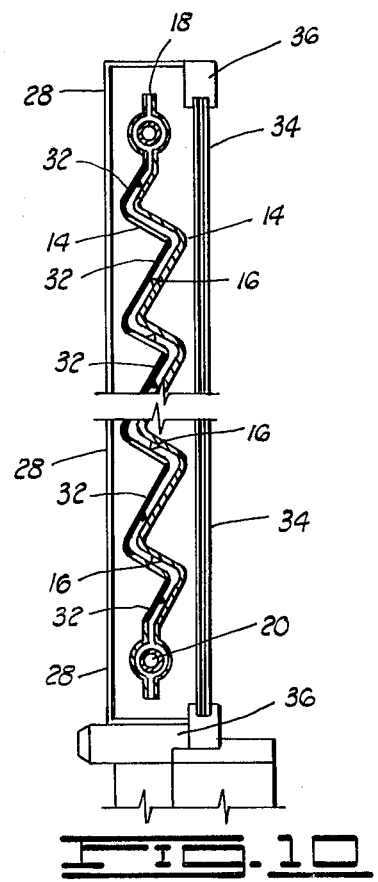

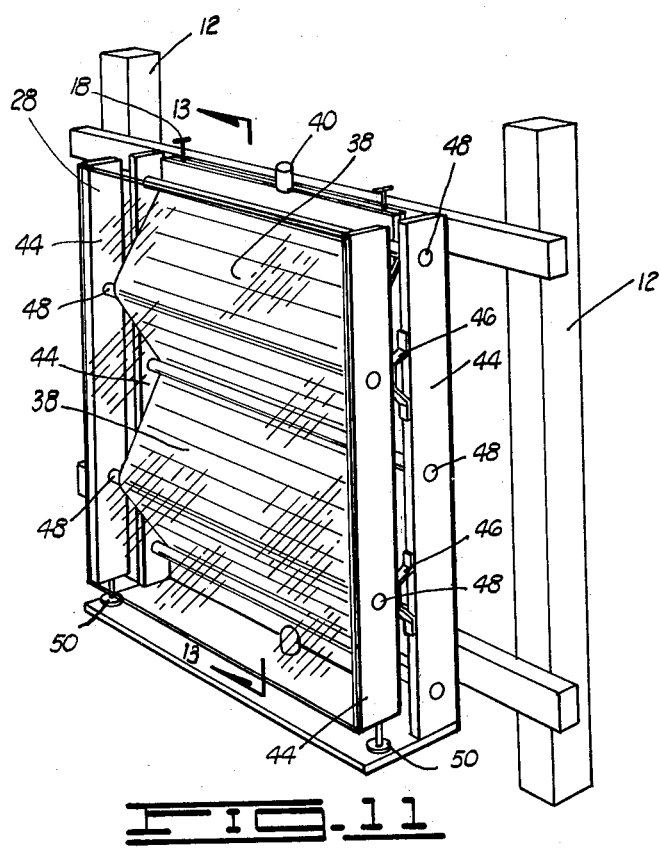
FIG-11
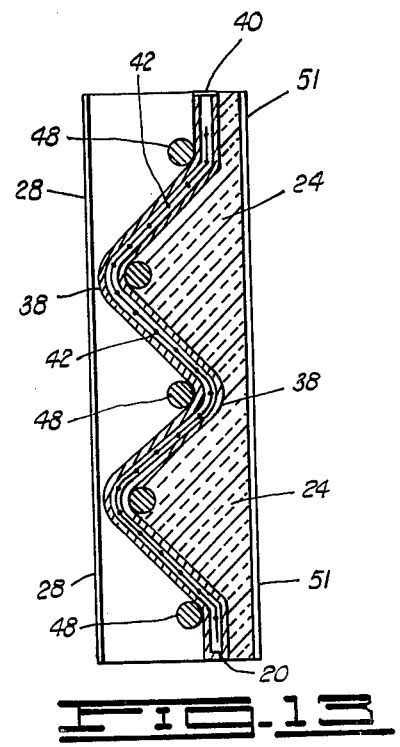
FIG-13
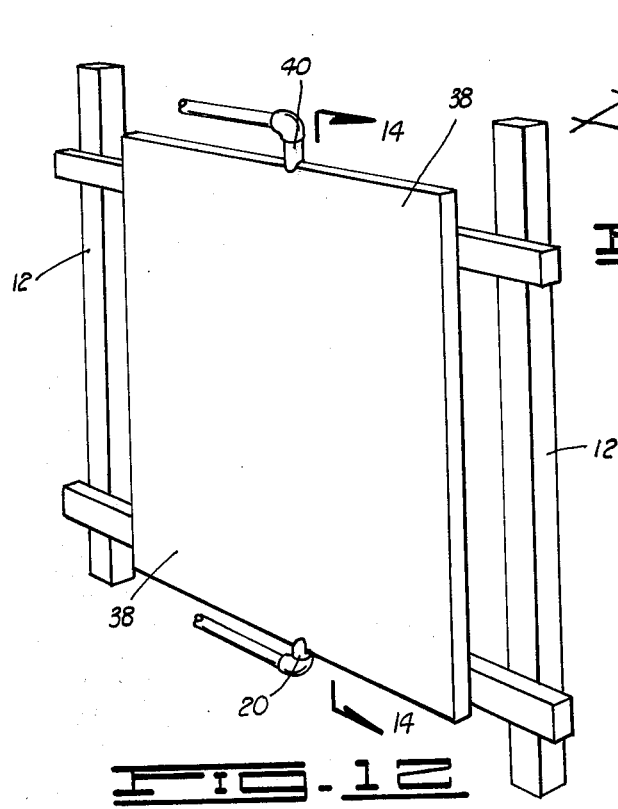
FIG-12
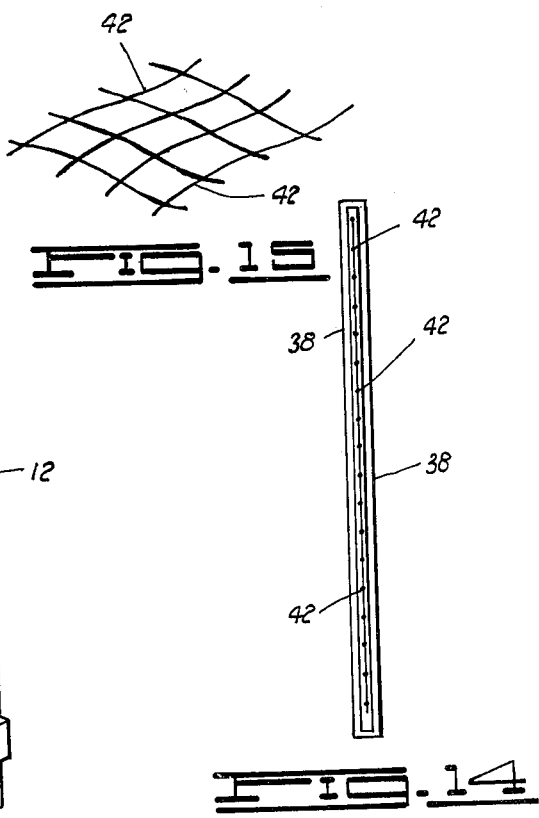
FIG-15
FIG-14

SOLAR PANEL

BACKGROUND OF THE INVENTION

1. Field of the Invention

The invention relates to a solar panel. More particularly, this invention provides for a solar panel and process for heating a swimming pool.

2. Description of the Prior Art

U.S. Pat. No. 4,062,350 discloses for a solar water heater; U.S. Pat. No. 4,046,133 illustrates a solar collector which attaches to a wall or roof of the space; U.S. Pat. No. 4,050,443 teaches a solar energy device and system; U.S. Pat. No. 3,960,135 illustrates a solar heater and thermal barrier; U.S. Pat. No. 4,051,832 discloses a solar heating panel having bosses to space the glass; and U.S. Pat. No. 3,990,635 discloses a window mounted solar heating unit. All of these prior art have deficiencies in one way or another, and don't teach the solar panel of this invention and a process for heating a swimming pool with the solar panel.

SUMMARY OF THE INVENTION

It is therefore an object of this invention to provide an economical process for heating a swimming pool.

It is another object of this invention to provide a solar panel with individual panel flow controls which utilize no tubes to clog or leak and uses about one-third the area of tube collectors.

It is yet another object of this invention to provide a solar panel which saves energy of existing heaters.

Still other objects will be apparent to those skilled in the art from the following description of this invention.

The foregoing objects are achieved according to the practice of this invention. Broadly, this invention includes a process for heating water in a swimming pool, or the like, comprising dimpling at least one of at least two corrugated heat retention surfaces at a depth between about ¼ inch and ½ inch; mating the heat retention surfaces, the mated surfaces being retained at a distance from each other depending on the depth of the dimpling step; orificing one end of the mated surfaces to control the flow of water between the mated surfaces; installing at least one pair of the mated surfaces on a means for exposing the mated surfaces to the sun in proximity to the swimming pool or the like; pumping water from the swimming pool, or the like, to the orificed end of the mated surfaces; flowing water through the mated surfaces toward an outlet therein at a rate of between about 10 lbs./sq. ft. of mated heat retention surface/min. and about 200 lbs/sq. ft. of mated heat retention surface/min. such as to form a water film exposed to the sun, the flow rate being determined by the orificing step; absorbing into the flowing water film between about 1250 BTU's/day/sq. ft. of mated heat retention surface and 2500 BTU's/day/sq. ft. of mated heat retention surface; and returning the BTU absorbed water from the outlet to the swimming pool or the like. The solar panel comprises at least two corrugated heat retention surfaces, each of which include a pair of opposite sides and opposing ends. At least one of the corrugated heat retention surfaces includes a surface defining a plurality of dimples; the heat retention surfaces being mated with each other, remaining separated by the dimples. One end of the mated heat retention surfaces includes an orifice means to control the flow of water between the mated surfaces and the other end has an outlet for solar heated water.

These together with various ancillary objects and features which will become apparent to those artisans possessing ordinary skill in the art and as the following description proceeds, are attained by this novel solar panel and process for heating a swimming pool, a preferred embodiment shown in the accompanying drawings, by way of example only wherein:

BRIEF DESCRIPTION OF THE DRAWINGS

FIG. 3 is an enlarged vertical sectional view of a solar panel mounted on a rail fence and illustrating the orifice and flow control valve received between the panels;

FIG. 4 is a partial enlarged perspective view of a solar panel illustrating dimples in the panels for controlling the spacing between the two heat absorbing panels;

FIG. 5 is a schematic flow diagram illustrating the plumbing system for heating a swimming pool by interconnected solar panels;

FIG. 8 is a vertical sectional view of a single face solar panel having a double layer transparent corrugated panel with air space in between;

FIG. 9 is a vertical sectional view of a double face collector with a fence post between panels;

FIG. 10 is a vertical sectional view of a single face solar panel in between a light dispensing cover and a double glass window and having a plurality of heat retention strips for solar collection;

FIG. 11 is a perspective view of a black plastic solar panel including a netting means with a diamond pattern and having vertical side members and threadably acting control knobs with feet regulating the angles of the resulting panel sections in accordance with the position of the sun;

FIG. 12 is a perspective view of two sheets of pliable black plastic material sealed at their edges all around and having a netting means with a diamond pattern between the two sheets;

FIG. 13 is a vertical sectional view taken along the plane of line 13—13 in FIG. 11;

FIG. 14 is a vertical sectional view taken along the plane of line 14—14 in FIG. 12; and FIG. 15 is a partial view of the netting means having a diamond pattern.

DETAILED DESCRIPTION OF THE INVENTION

Figure 1:
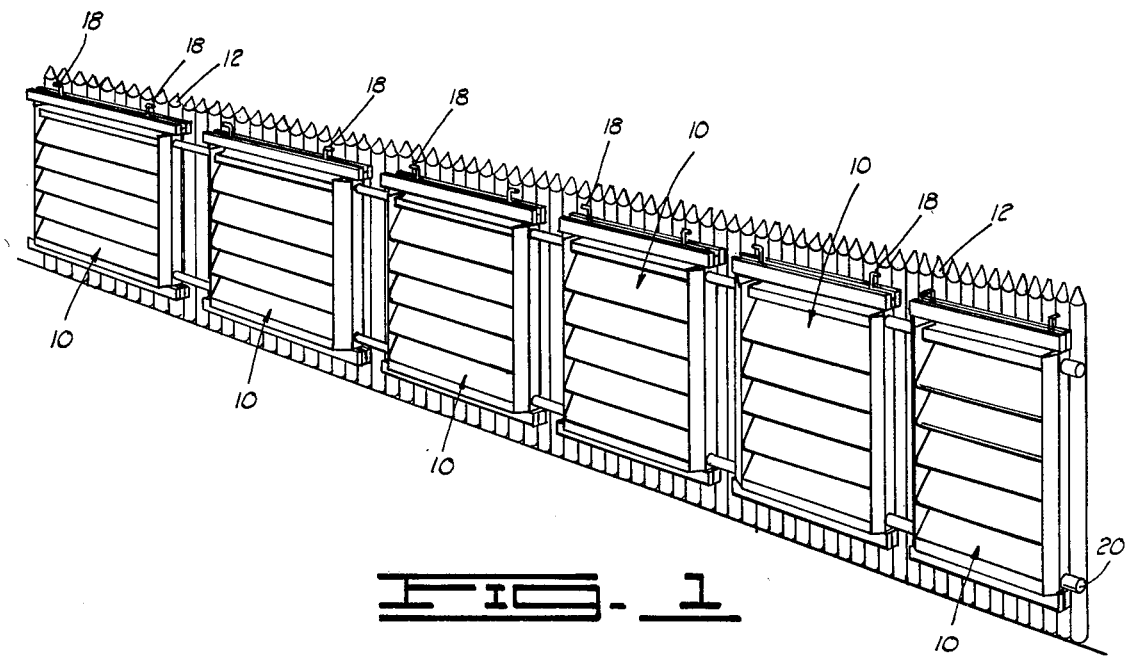
FIG. 1 is a perspective view of a plurality of interconnected solar panels mounted on a rail fence.
Figure 2:
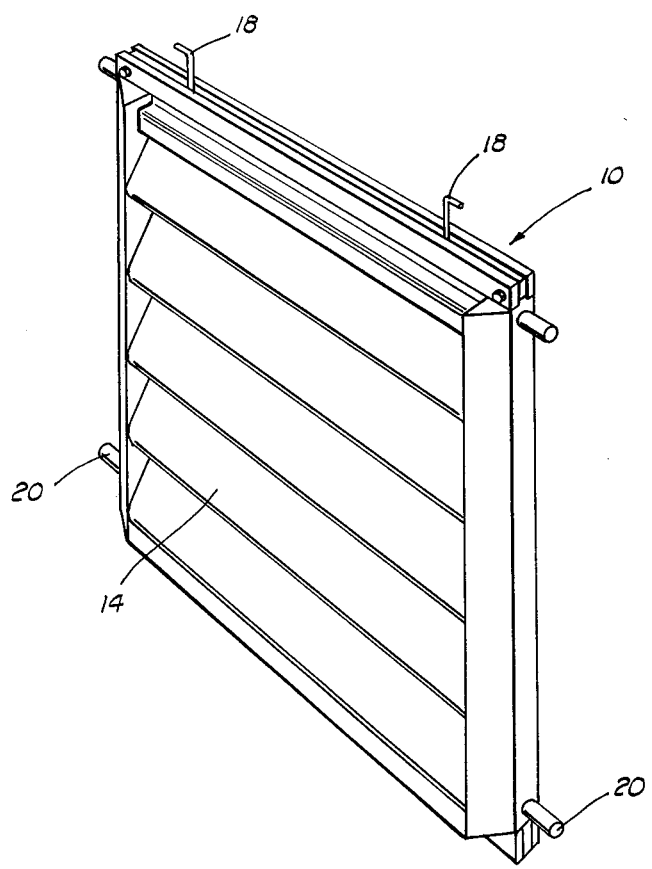
FIG. 2 is a perspective view of a single solar panel.

With continual reference to the drawings, wherein similar parts are identified by like reference numerals, a solar panel, generally illustrated as 10, which may be connected in series on a fence 12 as illustrated in FIG. 1, includes corrugated heat retention surfaces 14 (e.g. ABS coated with Korad, or any material of similar composition) having a plurality of dimples 16, and being mated with other and remaining separated by the dimples 16. One end of the mated heat retention surfaces 14 includes orifice means 18 to control the flow of water between the mated surfaces 14. Outlet 20 is for solar heated water to exit. A vertical cross section of the mated heat retention surfaces 14 in the preferred embodiments of FIGS. 8, 9, 10, 11, and 13 defines a sinusoid. In the preferred embodiment of FIG. 3 a heat reflective surface 22 (e.g. tin or any shiny surface) connects with the ends of the heat retention surfaces 14 and insulation 24 (e.g. fiberglass or urethane foam) may be situated between the heat reflective surface 22 and the heat retention surfaces 14. In the preferred embodiment of FIG. 8, the heat reflective surface 22 is lodged behind the mated heat retention surfaces 14 with insulation 24 situated contiguous to the heat reflective surface 22 and on the outside thereof such that an air zone exists between the heat reflective surface 22 and the mated heat retention surfaces 14. An air vent door 26 is connected to the ends of the heat reflective surface 22.

On the preferred embodiment of FIG. 3, a transparent corrugated panel 28 (e.g. polyethylene, acrylic, teflon (fluorinated ethylene propylene (FEP), Tedlar, Lexan (polycarbonate), Mylar, Polyimide, modified polyester, and "Sun Lite" (acrylic fortified fiber glass reinforced polyester)) with dimples 16 has its ends connecting with the ends of the heat retention mated surfaces 14 to create an air zone between the mated surfaces 14 and the transparent panel 28. Air vent door 26 exists at the end of the panel 28. In the preferred embodiment of FIG. 8 the transparent corrugated panel 28 is doubled layered with an air zone in between the layers and an air vent 26 connected on the ends thereof. An outer case 30 surrounds insulation 24 in this embodiment. Mated heat retention surfaces 14, as can be seen in FIG. 10, may include a plurality of transparent heat retention strips 32 (well known to those in the art) attached to the mated heat retention surfaces 14. A double glass window 34 is positioned in a frame 36 on one side of the heat retention surfaces 14 and the transparent light dispensing cover 28 is situated in frame 36 on the opposite side of the retention surfaces 14.

The preferred embodiments of FIGS. 11–14 show two sheets of pliable black plastic 38 (well known to those skilled in the art such as Otto Fabric of Owens-Corning Fiberglass Company) sealed at their edges all around. Inlet 40 allows absorbent liquid to flow between sheets 38 for exiting at the outlet 20. A net 42 which generally defines a diamond pattern is situated between the sheets 38 for distributing the absorbent liquid uniformly.

The sheets 38 of FIGS. 11 and 13 are corrugated such that a cross section defines a sinusoid. A pair of vertical side members 44 are situated on each side of the corrugated sheets 38. Each pair is spaced and separated by leaf springs 46. Rod members 48 interconnect opposite side members 44. Threadably acting control feet 50 are situated on the bottom of one opposite (see FIG. 11) side members 44 for regulating the angle of the corrugated sheets 38 in accordance with the position of the sun. The remaining opposite side members 44 are stationary.

The clear transparent sheet 28 attaches to the opposite side members 44 having the control feet 50 and provides an insulating air pocket between the sheets 38 and the transparent sheet 28.

A backboard 51 is attached to the stationary side members 44. Insulation 24 is positioned between the backboard 51 and the sheets 38.

Figure 6:
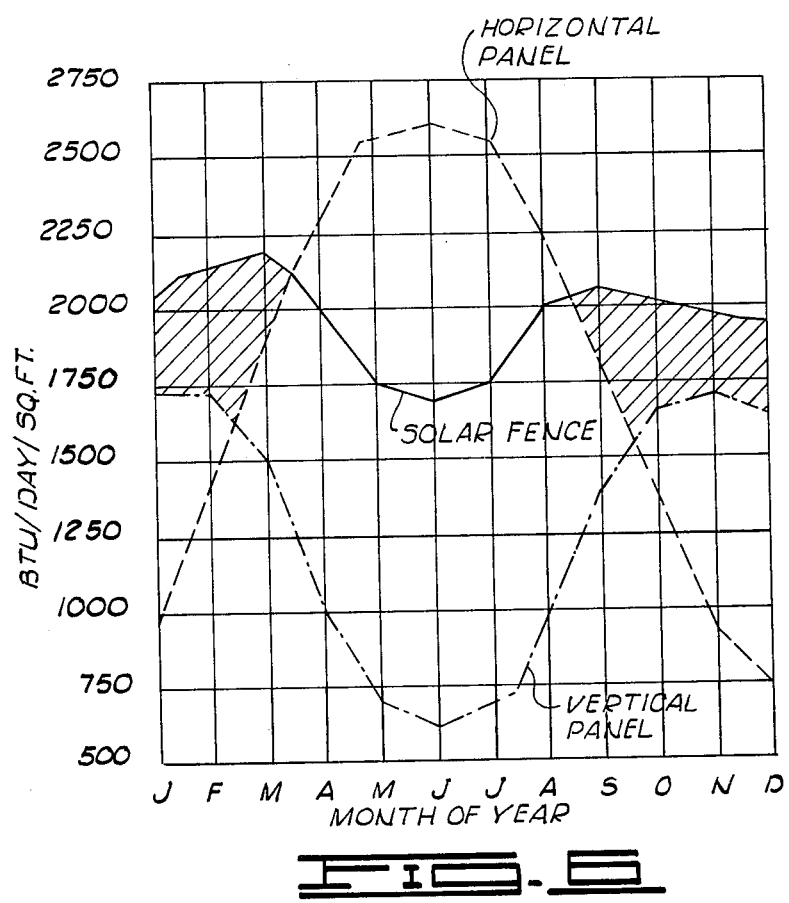
FIG. 6 is a graph showing the variation of BTU/day/sq. ft. for the solar panel vs a prior art horizontal panel and vertical panel for each month of the year.

With continuing reference to the drawings, particularly FIGS. 5–6, for operation and process of the invention, any of the embodiments of mated heat retention surfaces 14 in FIGS. 2, 3, 4, 8, 9, 10 and including FIGS. 11–14, are dimpled when appropriate with dimples 16 on the surface of mated heat retention surfaces 14 at a depth between about $\frac{1}{4}$ inch and $\frac{1}{2}$ inch, the mated surfaces 14 being retained at a distance from each other depending on the depth of the dimples 16. One end of the mated heat retention surfaces 14 is orificed with orifice 18 to control the flow of absorbent fluid (e.g. water) between the mated surfaces 14. At least one pair of the mated surfaces 14 is installed on a means for exposing the mated surfaces 14 to the sun, preferably fence post 12, in proximity to a swimming pool (see FIG. 5), generally illustrated as 52, or the like. Water is pumped via conductor 72 by pump 54 through strainer 56 and filter 58, check valves 60, 62 to orifices 18 of the six (6) heat retention surfaces 14. Check valve 68 and valve 66, contiguous to drain valve 64 remain closed. The water is flowed through the mated surfaces 14 toward outlet 20 at a rate of between about 10 lbs./sq. ft. of mated heat retention surface 14/min. and about 200 lbs./sq. ft. of mated heat retention surface 14/min. such as to form a water film exposed to the sun. Between about 1250 BTU's/day/sq. ft. of mated heat retention surface 14 and 2500 BTU's/day/sq. ft. of mated heat retention surface 14 are absorbed in the flowing water film. Flow through surfaces 14 can be by gravity if desired. The BTU absorbed water is returned from outlet 20 through valve 70 to heater 72 where it is heated prior to entering the pool 52.

Figure 7:
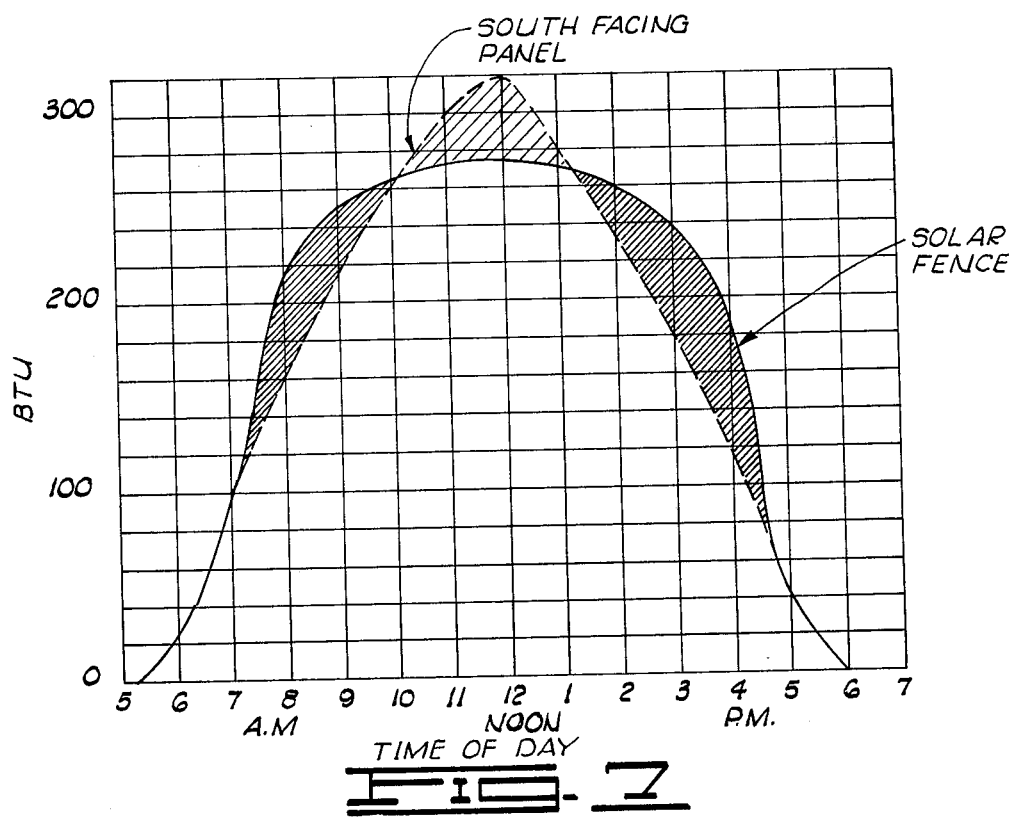
FIG. 7 is a graph showing the variations of BTU's for the solar fence vs a prior art south facing panel for each hour during the day.

Performance parameters for this process can be seen in FIGS. 6 and 7. The hatched area of FIG. 6 indicates increased high heating months to extend pool season by utilization of the solar fence of FIG. 5 via a horizontal panel and a vertical panel. The shaded area in FIG. 7 indicates increased daily heating capacity of the solar fence of FIG. 5 without the overheating at mid-day of a south-facing panel (see hatched area in FIG. 7).

We claim:

1. A process for heating water in a swimming pool, or the like, comprising:
    (a) dimpling at least one of at least two corrugated heat retention surfaces at a depth between about $\frac{1}{4}$ inch and $\frac{1}{2}$ inch;
    (b) mating said heat retention surfaces; said mated surfaces being retained at a distance from each other depending on the depth of said dimpling step (a);
    (c) orificing one end of said mated surfaces of step (b) to control the flow of water between said mated surfaces of step (b);
    (d) installing at least one pair of said mated surfaces of step (c) on a means for exposing said mated surfaces to the sun in proximity to the swimming pool, or the like;
    (e) pumping water from the swimming pool, or the like, to the orificed end of said mated surfaces of step (d);
    (f) flowing the water of step (e) through said mated surfaces of step (e) toward an outlet therein at a rate of between about 10 lbs./sq. ft. of mated heat retention surface/min. and about 200 lbs./sq. ft. of mated heat retention surface/min. such as to form a water film exposed to the sun, said flow rate being determined by said orificing step (c);
    (g) absorbing into said flowing water film of step (f) between about 1250 BTU's/day/sq. ft. of mated heat retention surface and 2500 BTU's/day/sq. ft. of mated heat retention surface; and (h) returning said BTU absorbed water of step (g) from said outlet to said swimming pool, or the like.

2. The process of claim 1 additionally including insulating between said means for exposing to the sun and said mated surfaces prior to step (d).

3. The process of claim 2 additionally including installing a transparent panel means after step (d) on said mated surfaces to create an air zone between said installed mated surfaces and said transparent panel means.

4. The process of claim 3 additionally including venting said air zone on at least two ends for cooling water during evenings.

5. The process of claim 4 wherein said venting is done at the top and at the bottom of said installed mated surfaces, said venting being automatic to aid daily operating temperature.

6. The process of claim 5 additionally including installing a heat reflective surface between said insulation and said fence of claim 2.

7. The process of claim 6 additionally including heating said BTU absorbed water of step (h) prior to returning same to said swimming pool, or the like.

8. The process of claim 7 additionally including installing a plurality of said mated surfaces of claim 6 in series to heat said swimming pool, or the like.

9. The process of claim 8 wherein said flowing step (f) is by gravity.

10. The process of claim 9 additionally including straining said water prior to pumping step (e), and filtering said water subsequent to pumping and prior to entering the orificed end of said mated surfaces.

11. The process of claim 10 wherein said means for exposing to the sun is a fence.

* * * * *